United States Patent
Anacker et al.

(10) Patent No.: US 6,499,764 B2
(45) Date of Patent: Dec. 31, 2002

(54) GAS GENERATOR

(75) Inventors: Lothar Anacker, Kersbach (DE); Karl Bayer, Berg (DE); Eduard Berenz, Furth (DE); Uwe Brede, Furth (DE); Anton Bretfeld, Furth (DE); Josef Kraft, Berg (DE); Gerrit Scheiderer, Furth (DE); Waldemar Weuter, Furth (DE); Jiang Zhang, Nuremberg (DE)

(73) Assignee: Dynamit Nobel GmbH Explosivstoff-und Systemtechnik, Troisforf (DE)

( * ) Notice: Subject to any disclaimer, the term of this patent is extended or adjusted under 35 U.S.C. 154(b) by 0 days.

(21) Appl. No.: 09/921,748

(22) Filed: Aug. 6, 2001

(65) Prior Publication Data

US 2002/0074787 A1 Jun. 20, 2002

Related U.S. Application Data

(62) Division of application No. 09/446,021, filed on Mar. 8, 2000, now abandoned.

(30) Foreign Application Priority Data

Jun. 17, 1997 (DE) .......................................... 197 254 76

(51) Int. Cl.$^7$ ............................................. B60R 21/26
(52) U.S. Cl. ...................... 280/737; 280/741; 102/530; 222/5
(58) Field of Search ............................... 280/737, 741, 280/736; 222/5; 102/530, 531; 137/68.13, 68.29, 68.3

(56) References Cited

U.S. PATENT DOCUMENTS

| | | | | |
|---|---|---|---|---|
| 3,868,124 A | * | 2/1975 | Johnson | 102/360 |
| 5,195,777 A | * | 3/1993 | Cuevas | 222/3 |
| 5,266,668 A | * | 11/1993 | Heumuller et al. | 526/245 |
| 5,345,876 A | * | 9/1994 | Rose et al. | 102/531 |
| 5,462,307 A | * | 10/1995 | Webber et al. | 222/5 |
| 5,618,057 A | * | 4/1997 | Johnson et al. | 137/543.15 |
| 5,639,117 A | * | 6/1997 | Mandzy et al. | 102/530 |
| 5,664,804 A | * | 9/1997 | Saccone | 137/68.13 |
| 5,709,406 A | * | 1/1998 | Buchanan | 102/531 |
| 5,711,547 A | * | 1/1998 | Blumenthal et al. | 280/737 |
| 6,289,820 B1 | * | 9/2001 | Anacker et al. | 102/530 |

FOREIGN PATENT DOCUMENTS

| | | |
|---|---|---|
| DE | 2120277 | 4/1971 |
| DE | 2153674 | 10/1971 |
| DE | 2344519 | 4/1973 |
| DE | 2429919 | 6/1974 |
| DE | 4443681 | 12/1994 |
| DE | 43 27 098 A1 * | 2/1995 |
| DE | 19644258 | 10/1996 |

* cited by examiner

*Primary Examiner*—Paul N. Dickson
*Assistant Examiner*—Ruth Ilan
(74) *Attorney, Agent, or Firm*—Antonelli, Terry, Stout & Kraus, LLP

(57) ABSTRACT

A gas generator includes an ignition charge, at least one ignition element for igniting the ignition charge, a storage chamber containing a compressed gas, which storage chamber is closed by a closure element, and an impact element destroying the closure element under pressure. A piston is provided as the impact element, which piston, after the destruction of the closure element, forms an exit gap with the opening closed by the closure element. The cross-sectional area of which exit gap changes in according to the position of the piston.

3 Claims, 4 Drawing Sheets

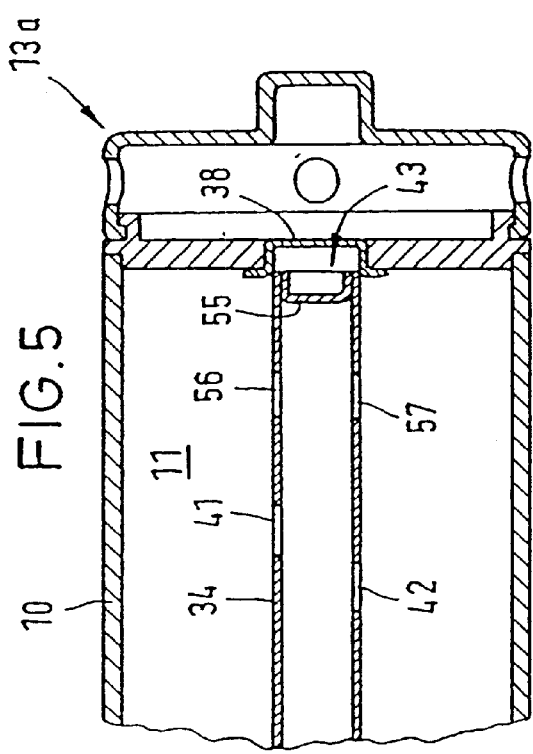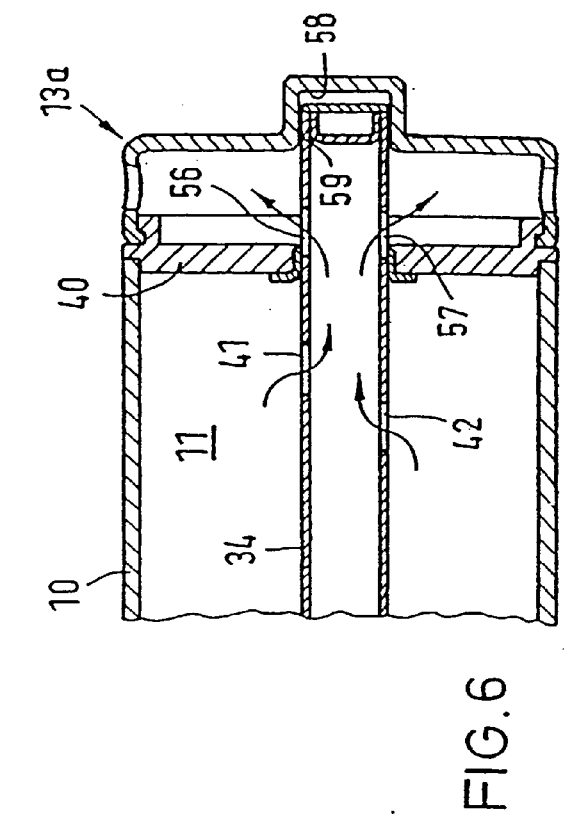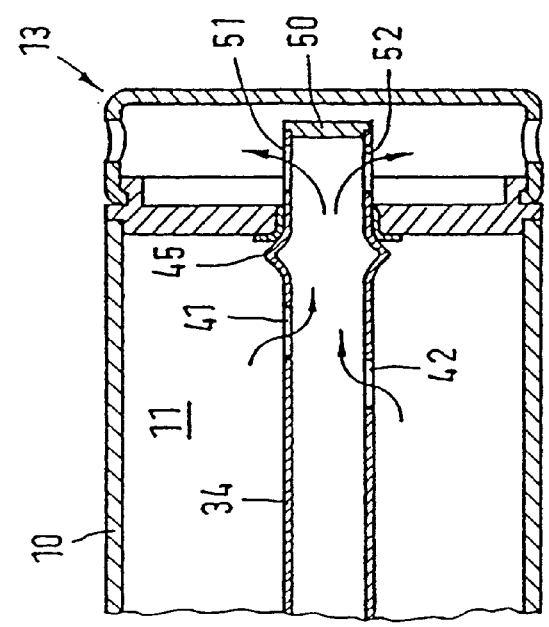

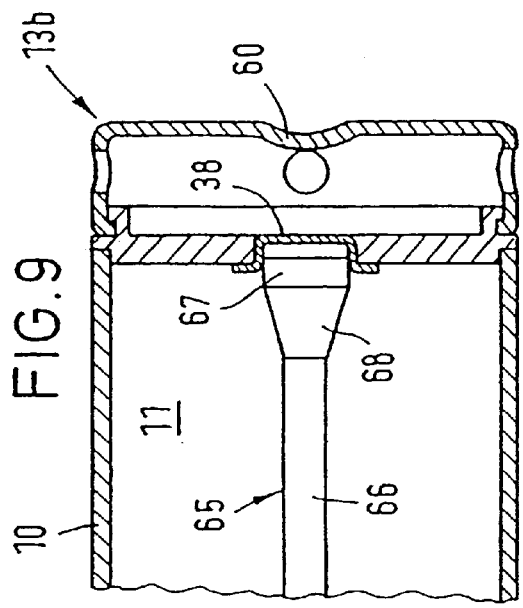
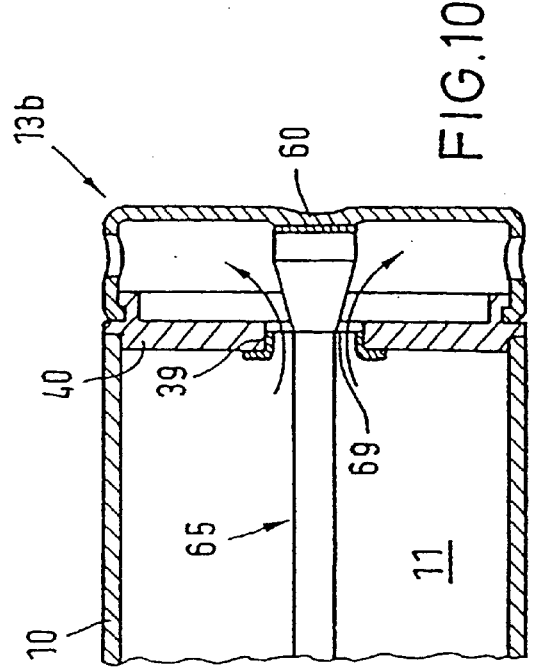
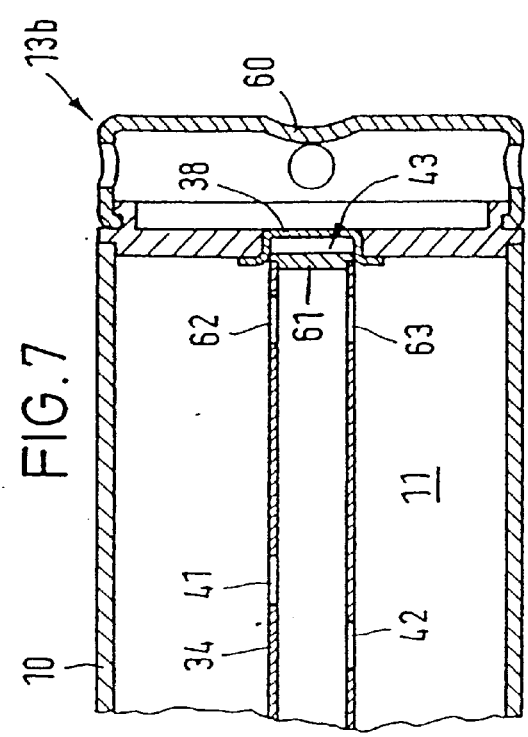
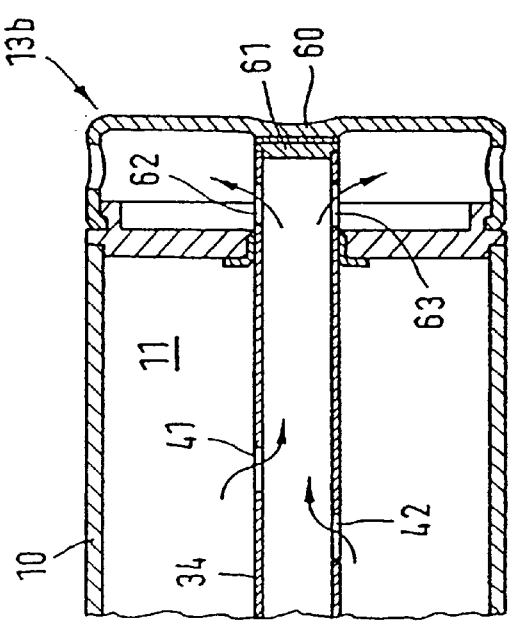

GAS GENERATOR

This is a divisional application of U.S. Ser. No. 09/446,021, filed Mar. 8, 2000 now abandoned.

BACKGROUND OF THE INVENTION

The invention relates to a gas generator, in particular a gas generator for air bags.

Gas generators for air bags have an ignitable ignition charge in a combustion chamber and a pressurized gas in a storage chamber. A gas or a solid fuel can be provided as ignition charge. Upon the initiation of the gas generator, an ignition element ignites the ignition charge. To open the storage chamber an impact element in the form of a piston is accelerated by the pressure produced during the combustion of the ignition charge, with the piston destroying a closure element of the storage chamber. In this way, the pressurized gas in the storage chamber can flow out through the opened outlet into the air bag. Moreover, the combustible gases produced as a result of the burning-away of the ignition charge flow into the storage chamber, where they mix with the pressurised gas. Therefore, after the destruction of the closure element, first of all cold pressurised gas and subsequently a mixture of pressurised gas and combustible gas flow into the air bag. In this way, hot combustible gases are prevented from the outset from arriving in the air bag.

The pressure characteristic of known gas generators is predetermined by the overall construction, with the air bag which is connected to the gas generator in each case being inflated quite suddenly.

The object of the invention is to create a gas generator which can be easily varied in order to achieve different pressure characteristics.

The gas generator in accordance with the invention has, for opening a closure element of the storage chamber, an impact element constructed as a tube and having several openings. The openings are arranged in such a way that, after the destruction of the closure element, at least one admission opening is arranged inside the storage chamber and at least one exit opening is arranged outside the storage chamber. In this way, after the destruction of the closure element, gas flows out of the storage chamber, through the admission opening into the tube and through the exit opening out of the tube into the air bag. The mass flow of the gas flowing through the openings can be influenced by the formation of one or more openings. Therefore, the mass flow can be influenced by the shape, the number and the arrangement of the inlet and/or exit openings. During the displacement of the tube upon the destruction of the closure element, a part of an entry opening or an exit opening can be closed and in the end position of the tube it can be completely open. In this way, the emergence of gas at the beginning of the inflation of the air bag is less. This avoids injuries to a driver or passenger by sudden inflation of the air bag.

By using differently shaped tubes as impact element, by varying a single component, gas generators can be manufactured with different pressure characteristics. Because the tube is a simple component, different formations of the tube can be produced easily and economically. Tubes with different openings which generate different pressure characteristics can be used in an otherwise unchanged gas generator. A change of the openings of the tube does not make necessary any changes on the rest of the assembly of the gas generator.

To change the temporal sequence of the pressure build-up, in a preferred embodiment of the invention the front of the tube which faces the closure element is closed. The exit openings are arranged on the circumference of the tube. Before the destruction of the closure element by the tube, the exit openings are arranged within the storage chamber. Upon the displacement of the tube for the destruction of the closure element, the exit openings are closed at least partially at the beginning of the displacement by a wall of the storage chamber. The further the tube exits from the storage chamber, the more the exit openings of the tube are opened. In this way, the pressure increase in the air bag at the beginning of the inflation is relatively small and increases continuously as the exit openings become larger.

In order to vary the temporal pressure characteristic, several exit openings can be staggered with respect to each other in the longitudinal direction of the tube. In particular, the exit opening can be constructed as a slot.

Several admission openings can be provided in the tube, so as to correspond with the exit openings, distributed on the circumference. The admission openings are preferably offset with respect to each other in the longitudinal direction in order to improve the flow performance upon the entry of the gas into the tube.

In another independent embodiment, a piston is provided in place of the tube, to control the pressure characteristic. The piston is formed in such a way that an exit gap is formed between the piston and the opening, closed by the closure element, after the destruction of the closure element, the cross-sectional area of which exit gap changes in dependence upon the position of the piston. If, for example, a tapering piston is used, the mass flow issuing from the gas generator increases with the displacement of the piston. The shape of the piston can be arbitrarily selected according to the desired pressure characteristic.

Both with the impact element constructed as a tube and with the impact element constructed as a piston, the pressure characteristic can be further optimized by the provision of a damping element. In this respect, the damping element can be deformable in an elastic or plastic manner. Thus, by means of an elastic damping element, for example a spring, the exit opening in the end phase of the inflation of the air bag may again be partially closed in order to reduce the strain on the air bag.

To dampen the tube or the piston, it can, moreover, plunge into a recess. In this respect, the intensity of the damping depends on the gap width between the recess and the tube or piston.

A further possibility of changing the pressure characteristic is the arrangement of at least one additional ignition composition in the ignition charge. The additional ignition composition or compositions can be ignited in a time-staggered manner with respect to the first ignition composition which activates the gas generator. The ignition of another ignition composition effects an increase of the pressure in the storage chamber and therefore a change of the pressure characteristic in the air bag. The ignition of further ignition compositions can also be made dependent on external parameters, for example the vehicle speed or similar.

BRIEF DESCRIPTION OF THE DRAWINGS

The invention will be explained in more detail in the following with reference to preferred embodiments and with reference to the drawings.

FIGS. 3–8 show partial sections of different embodiments of gas generators with a tube before and after the initiation.

FIGS. 9 and 10 show a partial section of a gas generator with a piston before and after the initiation.

DETAILED DESCRIPTION OF THE PREFERRED EMBODIMENTS

Figure 1:
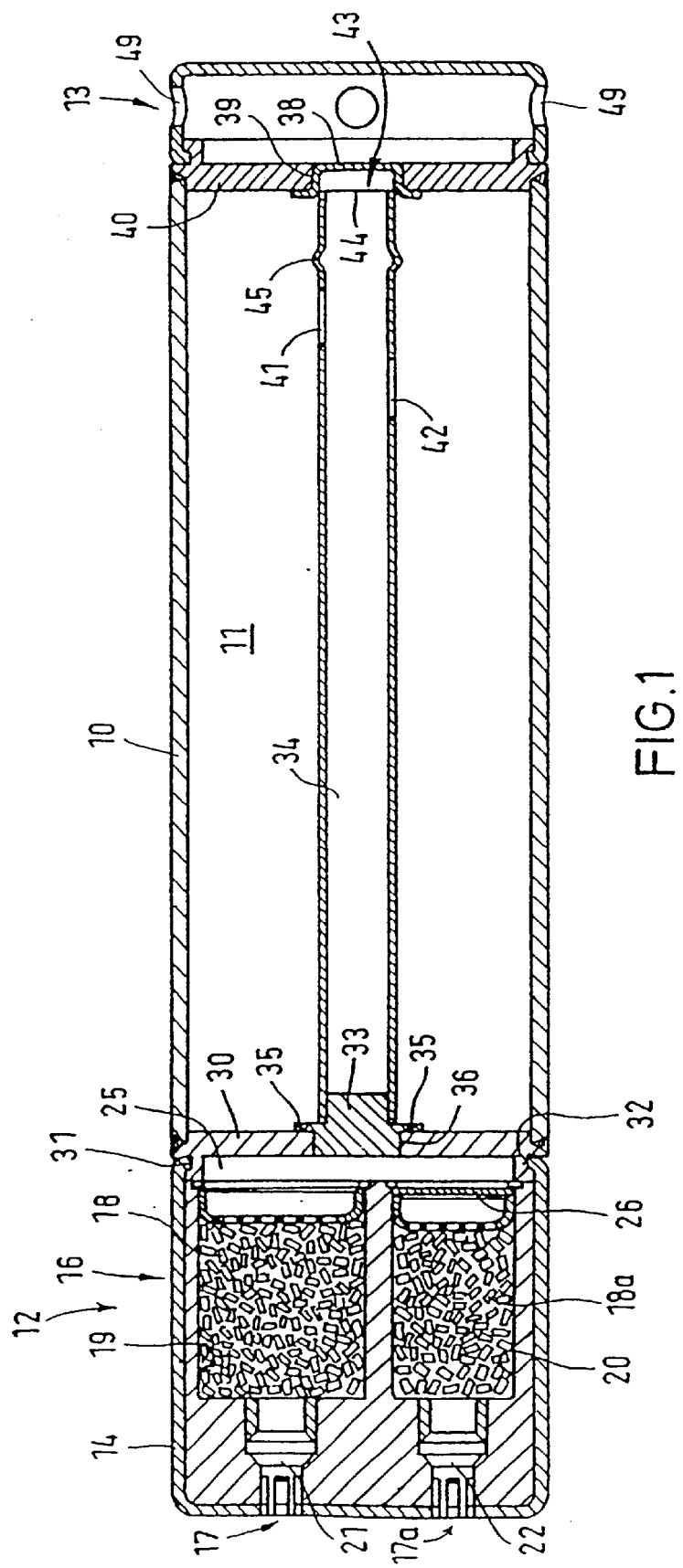
FIG. 1 shows a longitudinal section of a first embodiment of a gas generator with a tube.

All the exemplifying embodiments have, corresponding to FIG. 1, a tubular housing 10, the interior of which forms the storage chamber 11. One end of the housing 10 is connected to a charge head 12 and the opposite end is connected to a diffusor head 13.

An ignition charge 16 is arranged in a housing 14 of the charge head 12, the ignition charge consisting of two ignition compositions 17, 17a. The ignition compositions 17, 17a each have a solid fuel charge 18, 18a which are each arranged in a combustion chamber 19, 20. Each ignition composition 17, 17a has, moreover, an ignition element 21, 22 for igniting the solid fuel charges 18, 18a. The ignition elements 21, 22 can be ignited electrically by a control component (not shown). They each contain an ignition charge which burns away and thereby ignites the associated ignition composition 17, 18.

The combustible gas produced upon the burning-away of the solid fuel charge 18 in the combustion chamber 19 flows into the intermediate chamber 25. To avoid ignition of the second solid fuel charge 18a by the combustible gas present in the intermediate chamber 25, the combustion chamber 20 is closed by a cover 26. In this way, the solid fuel charge 18a can be ignited by the ignition element 22 at a later time, with the cover 26 being destroyed by the pressure produced in the combustion chamber 20 upon the combustion of the solid fuel charge 18a.

The housing 14 of the charge head 12 is connected to a cover 30 of the housing 10 by an edge of the housing 14 which points in the direction of the cover 30 being edged into a groove 32 of the cover. The cover 30 is welded to the housing 10 in order to tightly close the storage chamber 11.

A head part 33 of a tube 34 used as impact element is arranged in the cover 30. The head part 33 is connected to the cover 30 in such a way that, with adequate gas pressure in the intermediate chamber 25, predetermined breaking points 35 of the head part 33 break. In the process, the head part 33 is pressed into the storage chamber 11 by the gas pressure prevailing in the intermediate chamber 25. Together with the head part 33, the tube 34 firmly connected thereto is moved to the right in FIG. 1 and the combustible gas flows out of the intermediate chamber 25 into the storage chamber 11. In this respect, a closure element 38 is destroyed by the right end of the tube 34 in FIG. 1. The closure element 38 is arranged in an opening 39 of a cover 40 of the housing 10. The cover 40 is welded to the tubular housing 10 in order to seal the storage chamber 11 corresponding to the cover 30.

Figure 2:
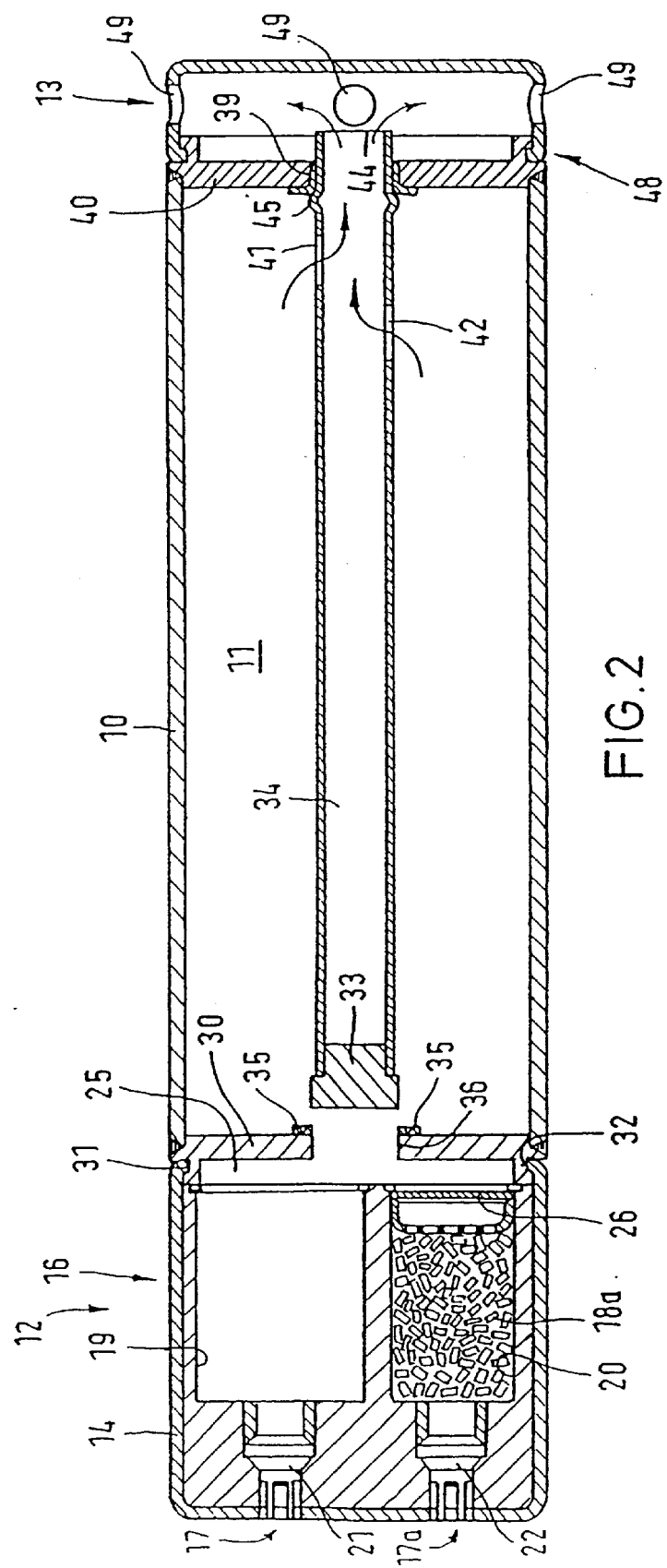
FIG. 2 shows the gas generator shown in FIG. 1 after the initiation.

In the embodiment shown in FIGS. 1 and 2 the tube 34 has admission openings 41, 42 which are staggered with respect to each other with regard to the longitudinal axis of the tube. The front end 43 of the tube 34 is open and is therefore used as exit opening 44.

In the position of the tube 34 shown in FIG. 2, a stop 45 abuts against the inner side of the cover 40 so that a situation is prevented where the tube 34 emerges too far out of the housing 10 and, for example, where the entry opening 41 is covered by the cover 40. In this way, the combustible gas flows out of the intermediate chamber 25, through the opening 36 of the cover 30 into the storage chamber 11, and on the opposite side compressed gas flows in the direction of the arrows out of the storage chamber 11, through the admission openings 41, 42 into the tube interior and through the exit opening 44 into the diffusor head 13.

The diffusor head 13 is securely connected to the cover 40 of the housing by means of a flanged connection 48. The gas flowing into the diffusor head 13 flows through openings 49, which are arranged on the circumference of the diffusor head 13, into the air bag which is not shown.

The part of the gas generators which is not shown in FIGS. 3 to 10 corresponds to FIGS. 1 and 2.

FIGS. 3 and 4 show another embodiment before and after the initiation of the gas generator. The front end 43 of the tube 34 is tightly closed by a flush closure 50. The tube 34 therefore has exit openings 51, 52 which are arranged close to the front end 43 of the tube on the circumference, so that the exit openings 51, 52, after the closure element 38 has been pushed through, are arranged in the diffusor head 13 or outside the storage chamber 11 (FIG. 4).

Corresponding to the embodiment shown in FIGS. 1 and 2, the tube 34 has a stop 45 and staggered admission openings 41, 42. In this way, the gas flows out of the storage chamber 11, after the destruction of the closure element 38, in accordance with the arrows shown in FIG. 4, through the admission openings 41, 42 into the tube interior and through the exit openings 51, 52 into the diffusor head 13. The diffusor head 13 is constructed corresponding to the embodiment described with reference to FIGS. 1 and 2.

In the embodiment shown in FIGS. 5 and 6 the front end of the tube 34 is likewise closed by a closure 55. The closure 55 is set up in an arched manner in the interior of the tube 34. Exit openings 56, 57 are provided on the circumference of the tube 34, the spacing of which exit openings from the front 43 of the tube 34 is greater than the spacing of the exit openings 51, 52 in the embodiment shown in FIGS. 3 and 4. The tube 34 has, in turn, corresponding admission openings 41, 42.

Upon the initiation of the gas generator, the tube 34, as described with reference to FIG. 1 and 2, is moved in the direction of a diffusor head 13a. In this respect, the closure element 38 is destroyed by the front end 43 of the tube 34. In this embodiment the 35 diffusor head 13a has a cylindrical recess 58. The diameter of the recess 58 is slightly larger than the outer diameter of the tube 34, so that when the tube 34 plunges into the recess 58 a gap 59 is formed between the tube 34 and the recess 58. When the tube 34 plunges into the recess 58 the air present in the recess 58 must escape through the gap 59. In this way, the displacement of the tube 34 is dampened.

As soon as the exit openings 56, 57 have passed the cover 40 at least partially, gas flows in the direction of the arrows shown in FIG. 6, out of the storage chamber 11, through the admission openings 41, 42 into the tube 34 and through the exit openings 56, 57 into the diffusor head 13a. During the dampened displacement of the tube 34 the exit openings 56, 57 are partially closed by the cover 40, with the result that the mass flow into the air bag is limited.

In the embodiment shown in FIGS. 7 and 8 an indentation 60 which is deformable in a plastic or elastic manner is arranged opposite the closure element 38 as damping for the tube 34 in a diffusor head 13b. The front end 43 of the tube 34 is provided with a closure 61 which can likewise be deformable in a plastic or elastic manner. Moreover, the tube 34 has exit openings 62, 63 arranged close to the front end 43 as well as admission openings 41, 42. After the destruction of the closure element 38, gas flows out of the storage chamber 11, in the direction of the arrows, through the tube 34 into the diffusor head 13.

The embodiment shown in FIGS. 9 and 10 has a piston 65 in place of the tube 34. The piston 65 consists of a piston rod 66 and a piston foot 67, the diameter of which is larger than the diameter of the piston rod 66. The piston 65 has a transition region 68, in the shape of a truncated cylinder, between the piston foot 67 and the piston rod 66. Moreover, the piston 65 is connected at the end opposite the piston foot 67 to a piston head, not shown, which corresponds to the head part 33 (FIG. 1) of the tube 34. Upon the initiation of the gas generator, the piston 65 is moved to the right in FIG. 9. As a result, the piston foot 67 destroys the closure element 38 and meets the indentation 60 of the diffusor head 13b which serves as damping means. Both the indentation 60 and the piston foot 67 can be deformable in an elastic or plastic manner.

In place of the indentation 60, the recess 58 described with reference to FIGS. 5 and 6 can also be provided in the diffusor head 13b for the damping of the piston 65.

As soon as the closure element 38 is destroyed, gas flows out of the storage chamber 11, in the direction of the arrows shown in FIG. 10, into the diffusor head 13b. As a result of the truncated part 68 of the piston 65, the mass flow through a gap 69 formed between the truncated part 68 and the opening 39 of the cover 40 is small at the beginning of the displacement. With increasing displacement of the piston 65 to the right in FIG. 10, the gap 69 becomes larger and the mass flow out of the storage chamber 11 accordingly increases.

The details described in the individual embodiments can also be meaningfully combined with each other for the further control of the temporal pressure characteristic. In this way, for example, the tube 34 can have an outer contour corresponding to the shape of the piston 65.

What is claimed is:

1. Gas generator, comprising:

an ignition charge, at least one ignition element for igniting the ignition charge, a storage chamber containing a compressed gas, which storage chamber is closed by a closure element, an impact element destroying the closure element under pressure, a piston being provided as the impact element, which piston, after the destruction of the closure element, forms an exit gap with the opening closed by the closure element, wherein the cross-sectional area of which exit gap changes according to the position of the piston, and a deformable damping element provided to dampen the displacement of the piston, wherein the front of the piston pushes against the deformable damping element to dampen the displacement of the piston.

2. Gas generator according to claim 1, characterized in that the ignition charge has at least one additional ignition composition ignitable in a time-staggered manner.

3. Gas generator according to claim 1, wherein the deformable damping element is spaced from the closure element so that the front of the piston pushes against the deformable damping element only at the end of the displacement of the piston.

* * * * *